United States Patent [19]
Martin

[11] Patent Number: 5,930,765
[45] Date of Patent: Jul. 27, 1999

[54] DOWNLOADING METHOD FOR SONGS AND ADVERTISEMENTS

[76] Inventor: John R. Martin, 5635 Nebeshonee La., Rockford, Ill. 61103

[21] Appl. No.: 08/975,612

[22] Filed: Nov. 21, 1997

Related U.S. Application Data

[63] Continuation-in-part of application No. 08/638,022, Apr. 25, 1996, Pat. No. 5,848,398, which is a continuation-in-part of application No. 08/584,253, Jan. 11, 1996, Pat. No. 5,781,889, which is a continuation of application No. 08/268,782, Jun. 30, 1994, abandoned, which is a division of application No. 07/846,707, Mar. 6, 1992, Pat. No. 5,355,302, which is a continuation-in-part of application No. 07/538,981, Jun. 15, 1990, abandoned.

[51] Int. Cl.⁶ .................................................. G06F 17/60
[52] U.S. Cl. ................ 705/14; 364/479.04; 395/200.61; 463/42
[58] Field of Search .................................. 705/1, 10, 14, 705/16; 395/200.47, 200.46, 200.49, 200.68, 200.61; 235/381; 364/479.01–479.06; 463/40–43

[56] References Cited

U.S. PATENT DOCUMENTS

| | | | |
|---|---|---|---|
| 4,860,201 | 8/1989 | Stolfo et al. | 395/800.11 |
| 4,956,768 | 9/1990 | Sidi et al. | 395/873 |
| 5,191,573 | 3/1993 | Hair | 369/84 |

FOREIGN PATENT DOCUMENTS

2193420  2/1988  United Kingdom .

*Primary Examiner*—Allen R. MacDonald
*Assistant Examiner*—Hani M. Kazimi
*Attorney, Agent, or Firm*—McAndrews, Held & Malloy, Ltd.

[57] ABSTRACT

The present invention provides a method of updating electronic data stored in numerous electronic amusement devices. The method includes the steps of providing a master information source from which new songs, programs, or other information, for example, advertisements, may be downloaded. The method also includes the steps of providing a first set of at least one non-updated electronic amusement device, connecting each non-updated electronic amusement device in the first set to the master information source and downloading information to the non-updated electronic amusement device, thereby providing at least one updated electronic amusement device. Additional non-updated electronic amusement devices may be updated according to the method by providing a second set of at least one non-updated electronic amusement device, and iterating the following steps: selecting an updated electronic amusement device, selecting a subset of the second set of at least one non-updated electronic amusement devices, connecting the selected updated electronic amusement device to each non-updated electronic amusement device in the selected subset, and downloading information to the non-updated electronic amusement devices, thereby providing at least one additional updated electronic amusement device. The additional updated electronic amusement devices may then be chosen in subsequent iterating steps to update non-updated electronic amusement devices.

30 Claims, 6 Drawing Sheets

DOWNLOADING METHOD FOR SONGS AND ADVERTISEMENTS

CROSS-REFERENCE TO RELATED APPLICATIONS

This application is a Continuation In Part of application Ser. No. 638,022 filed Apr. 25, 1996, now issued U.S. Pat. No. 5,848,398, which is a Continuation In Part of application Ser. No. 584,253 filed Jan. 11, 1996 now U.S. Pat. No. 5,781,889 which is a Continuation of application Ser. No. 268,782 filed Jun. 30, 1994, now abandoned, which is a Divisional of application Ser. No. 846,707 filed Mar. 6, 1992, now issued U.S. Pat. No. 5,355,302, which is a Continuation In Part of application Ser. No. 538,981 filed Jun. 15, 1990, now abandoned.

STATEMENT REGARDING FEDERALLY SPONSORED RESEARCH OR DEVELOPMENT

Not applicable.

BACKGROUND OF THE INVENTION

Electronic amusement devices, including jukeboxes, have been available for many decades. One feature of modern jukeboxes that has carried forward from the earliest machines is the ability to browse through a selection of songs and select one for play. Although it would not be uncommon to find a jukebox able to provide a selection of one hundred or more songs, or even complete compact discs (CDs), the benefits of providing an increased number of selections is counterbalanced by a unique set of difficulties.

One set of difficulties lies in initially installing, then updating the set of songs available in the jukebox. Currently, the songs played by modern jukeboxes are stored on CDs in the jukebox. Typically, a significant amount of time, expense, and potential inadvertent mishandling of CDs (or the amusement device itself) are incurred because the CDs are initially installed manually. The time, expense, and mishandling costs are then incurred each time new CDs become available and the old CDs are exchanged out for the new CDs.

Furthermore, it is difficult to predict the artists, titles, or timing of songs that may become popular. As a result, profits may be lost until the time consuming process of obtaining and replacing the CDs is carried out. Because of the unpredictability of popularity, changing CDs manually may become a significant drain on resources.

The difficulties described about with respect to changing CDs is not the only difficulty inherent with electronic amusement devices. In electronic dart games, for example, there are usually no CDs to change, but there may be electronic music, advertisements, or other displays that need to be updated on a regular or irregular basis. These electronics amusement devices also incur the substantial time, expense, and mishandling costs associated with changing CDs in a jukebox. As an example, an electronic dart game may include a sound ROM that would have to be swapped in order to update the music or other sounds associated with the dart game, or advertisements displayed on the dart game. In addition, an operator responsible for maintaining a large number of electronic amusement devices suffers the costs described above many times over. Large operations may further require hiring additional labor, purchasing additional CDs (or updating advertisements), and coping with inadvertently broken amusement devices.

U.S. Pat. No. 5,355,302 to Martin, et al. (hereby incorporated by reference in its entirety), discloses a system for managing a plurality of computer jukeboxes. In Martin, a central station is provided from which jukeboxes may download musical recording data. The central station may also receive data, for example, usage data, transmitted by each jukebox. At present, downloading a typical compressed musical recording or song over a phone line with a MODEM at approximately 28.8 Kbps may take as long or longer than 30 minutes. Therefore, if there are many jukeboxes that retrieve songs from the central station, the phone line may be in use for extended periods of time. As a result, some jukeboxes may not be able to reach the central station in order to download songs and it may take an inordinate amount of time to update all the jukeboxes.

A need exists in the industry for an improved downloading method for songs and advertisements which updates electronic amusement devices and overcomes the disadvantages discussed above and previously experienced.

BRIEF SUMMARY OF THE INVENTION

It is an object of the present invention to provide an improved method for expeditiously and inexpensively downloading updates to songs, advertisements, sounds, or other information to a plurality of electronic amusement devices where the devices may be remotely located with respect to each other.

A further related object of the present invention is to provide an improved method of allowing automatic updates to occur in a highly efficient manner to data stored in a plurality of electronic amusement devices which may be remotely located with respect to each other.

It is yet another object of the present invention to provide a method making possible a centralized distribution for updating information in electronic amusement devices, which method reduces the expenses associated with updating information in an electronic amusement device.

It is another object of the present invention to provide an improved method for downloading songs and other information making possible a configurable update path for information in electronic amusement devices.

It is a further object of the present invention to provide an improved method for downloading updates to songs and other information to a plurality of remotely located electronic amusement devices in an efficient, inexpensive, and configurable manner.

More specifically, the present invention provides an improved downloading method for updating electronic data stored in numerous electronic amusement devices. The improved method includes the steps of providing a master information source from which new songs, programs, or other data, for example, advertisements, may be downloaded. The improved method also includes the steps of providing a first set of at least one non-updated electronic amusement device, connecting each non-updated electronic amusement device in the first set to the master information source, and downloading information to the non-updated electronic amusement device, thereby providing at least one updated electronic amusement device.

Additional non-updated electronic amusement devices may then be updated according to the improved method by providing a second set of at least one non-updated electronic amusement device, and iterating the following steps: selecting an updated electronic amusement device from the first set, selecting a subset of the second set of at least one non-updated electronic amusement devices, connecting the selected updated electronic amusement device to each non-updated electronic amusement device in said selected subset, and downloading information to the non-updated electronic amusement devices, thereby providing at least one additional updated electronic amusement device. The additional updated electronic amusement devices may then be chosen in subsequent iterating steps (i.e., they may be considered to be members of the first set of updated electronic amusement devices) to continue to update non-updated electronic amusement devices.

The iterating steps described above may be repeated until the method has updated each non-updated electronic amusement device. Alternatively, the method may terminate after a predetermined number of iterations, and continue from where it left off at a later time or date. It is noted that an updated electronic amusement device need not connect to the same subset of non-updated electronic amusement devices each time the method is invoked. Rather, an updated electronic amusement device may choose freely from among the second subset of non-updated electronic amusement devices. Furthermore, the updated electronic amusement devices may select non-updated electronic amusement devices according to virtually any criteria. For example, the non-updated electronic amusement devices may be selected according the area code in which they are located, by type (for example, dart game, jukebox, or trivia game), or by the amount of time required to perform the update.

In general, the method described above allows the electronic amusement devices to be setup in a tree configuration (where the electronic amusement devices represent nodes in the tree). The tree configuration may have any number of levels, and any number of branches from the nodes at each level. The tree configuration allows multiple nodes to simultaneously update other nodes, and therefore may download information very efficiently.

Other objects, features, and advantages of the present invention will be readily apparent from the following description of certain preferred embodiments thereof taken in conjunction with the accompanying drawings, although variations and modifications may be effected without departing from the spirit and scope of the novel concepts of the disclosure.

DETAILED DESCRIPTION OF THE INVENTION

Figure 1:
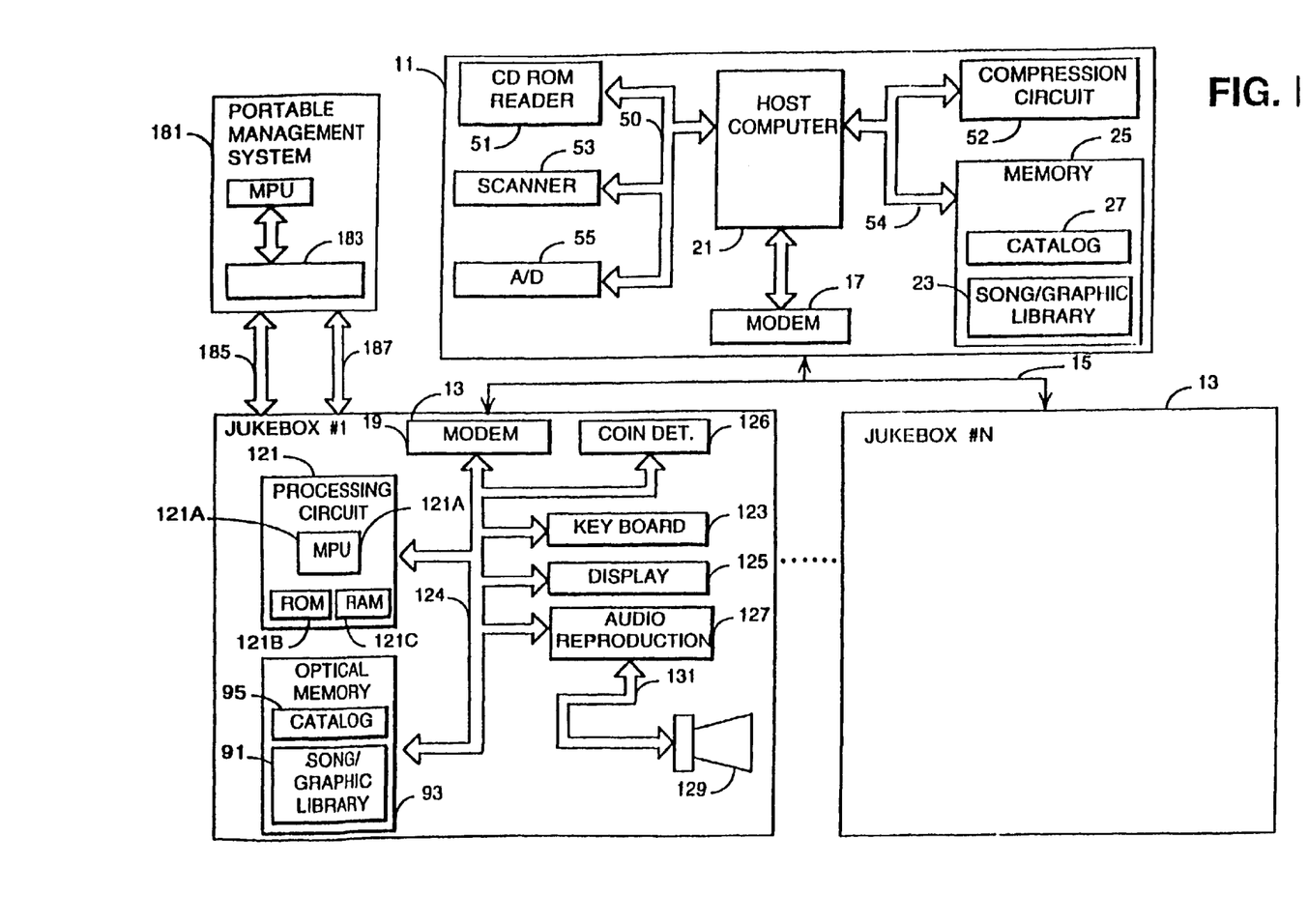
FIG. 1 illustrates a block diagram of an electronic amusement device suitable for use with the present invention.

Turning now to FIG. 1, a central station 11 monitors and updates the available selection of music, advertisements, or other information at a number of electronic amusement devices such as jukebox 13. For example, the central station 11 may monitor each jukebox 13 to determine the number of times each song has been played. From these numbers, the central station 11 can calculate the royalty payments that are due. More importantly, the central station 11 can identify those songs which need to be replaced in each jukebox 13 on an individual basis, the central station 11 communicating replacement songs to each jukebox 13 to update the available music selection as needed.

Each jukebox 13 generally includes a computer having sophisticated audio production capability wherein each jukebox 13 is programmed to play songs that have been digitally compressed and stored in a large volume data storage unit 93. The storage unit 93 may be implemented, for example, with a hard disk, an optical memory, or any other available nonvolatile computer memory that provides read access for playing songs or that provides read and write access for playing songs and storing new songs.

The central station 11 communicates with each jukebox 13 via a transmission link 15. The central station 11 and each jukebox 13 use respective modems 17 and 19 to maintain communication on the transmission link 15. The transmission link 15 may be a cable system such as a public or private telephones or the like. However, the modems 17 and 19 may be replaced with RF transceivers and associated antenna. In the later instance, the transmission link 15 is an RF link.

Specifically, the central station 11 includes a host computer 21 which maintains a master library 23 of songs and optionally associated graphics which are stored in a compressed digital form in a bulk storage unit 25. The bulk storage unit 25 is capable of storing vast amounts of digital data, and may, for example, take the form of a read-write optical storage device, a hard disk, or a solid state memory. The host computer 21 indexes the master library 23 by using a master catalog 27 which is also maintained in the bulk storage unit 25.

The master catalog 27 stores a song record 29 for each song stored in the master library 23. Each song record may include information fields including, for example: a) a title field, containing the name of the song; b) a classification field, containing the type of music, i.e., country, pop, jazz, classical, etc.; c) a song address field, containing the beginning address in the bulk storage unit 25 of the compressed digital data of the song; d) a song size field, containing the length in bytes of the compressed digital data; e) a graphics address field, containing the beginning address in the bulk storage unit 25 of the compressed digital data of graphics images, if any, to be associated with the song; f) a graphics size field, containing the number length in bytes of the compressed graphics image; and g) a play count field, containing a count which indicates the number of times the associated song has been played.

Each jukebox 13 plays songs and optionally displays graphics which are stored locally in the large-volume data storage unit 93. The storage unit 93 of the jukebox 13 contains a subset of the songs found in the master library 27 maintained by the central station 11. More specifically, the storage unit 93 of the jukebox 13 stores a song library 91 which is a corresponding subset of the master library 27. The song library 91 contains all of the currently available song selections and associated pictorial graphics, if any, for the jukebox 13. The storage unit 93 also stores a catalog 95 that is similar to the master catalog 23. Both the song library 91 and the associated catalog 95 are monitored and updated by the central management system 11 as needed via the transmission link 15.

The jukebox 13 also includes a processing circuit 121 which contains a microprocessor 121A, read only memory (ROM) 121B and random access memory (RAM) 121C. As in conventional computer systems, the microprocessor 121A operates in accordance with the software contained in ROM 121B and uses the RAM 121C, for example, for scratchpad memory. The processing circuit 121 may also contain a decompression algorithm which decompresses any compression applied by the central station 11.

The processing circuit 121 controls the operation and flow of data into and out of the jukebox 13 through the modem 19 via a bus 124. Using the bus 124, the processing circuit 121 also controls a visual display 125, one or more selection keys 123, and a coin/bill detector 126 to provide the user with an interactive interface to the jukebox 13. The keys 123 provide signals representing user inputs such as displayed song selection. A touchscreen (not shown) may also provide user inputs by providing a feedback mechanism to song selection graphics, song playing controls, or other information displayed on the visual display 125.

The display 125 displays alpha numeric information as well as pictorial graphics to interface with the user. The coin/bill detector 126 is responsive to one or more coins or bills input by a customer to determine whether the proper amount of money has been input and to provide money detect signals coupled to the processing circuit. The processing circuit 121 further controls, via the bus 124, an audio reproduction circuit 127 coupled to a speaker system 129 along a bus 131 to provide an audio output to the user.

Figure 2:
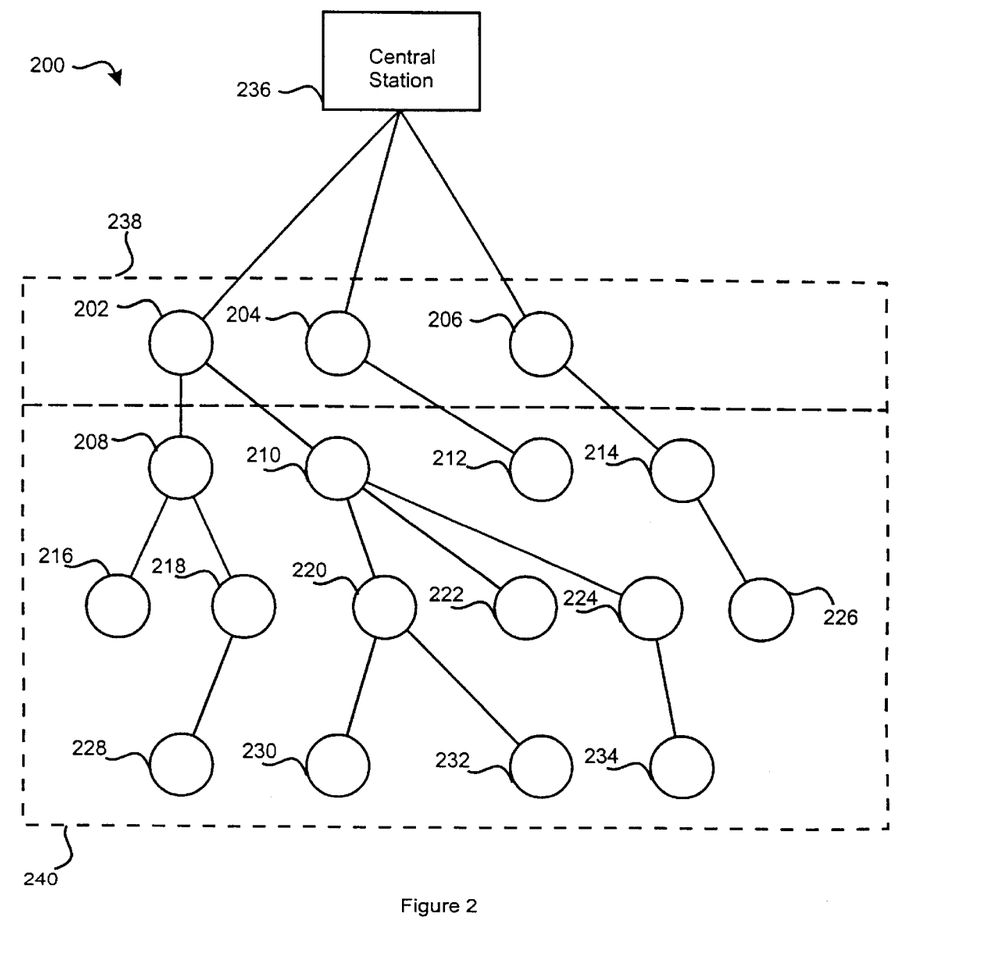
FIG. 2 shows the connections between a first set and a second set of non-updated electronic amusement devices and a central station.

Turning now to FIG. 2, a configuration 200 of electronic amusement devices 202–234 connected to a central station 236 is shown. The central station 236 may be implemented, for example, as the management system 11 shown in FIG. 1. The amusement devices may be implemented, for example, as the computer jukebox 13 shown in FIG. 1, or may be configured as dart games, electronic trivia games, and the like. The connections between the central station 236 and the amusement devices 202–234 are typically implemented as a MODEM connection over a telephone line but may include other forms of communication. The connections may be implemented, for example, as an Integrated Services Digital Network (ISDN) connection or as a general network connection, for example, a Synchronous Optical Network (SONET) or Ethernet connection, optionally connected to the Internet. Other suitable implementations for the connections include serial or parallel data buses, satellite connections, microwave transmissions, or even cable television connections.

Under the operation of the processing circuit 121 or the host computer 21, the central station 236 or the amusement devices 202–234 may schedule regular or irregular data transfer operations (downloads) between the amusement devices 202–234 and the central station 236 (most commonly song updates for the amusement devices 202–234). Information, for example, song selection information, may also flow from the amusement devices 202–234 to the central station 236. External input devices such as keyboards, touchscreens, mice, and scanners (not shown) may be used to control the amusement device 202–234 updates. In addition, timers, implemented as, for example, real time clocks, may be used to schedule periodic amusement device 202–234 updates.

For example, when a new song becomes popular, the central station 236 may retrieve the song from its storage and transmit the song to selected amusement devices in order to replace an old song no longer popular. The central station 236 may also send advertisements, program updates, or other information to receivers. For example, the central station 236 may send a new advertisement to a receiver in a dart game for display on a screen included in, or connected to, the dart game itself. The advertisement need not be visual in nature. It may be solely audio, or it may include both audio and visual elements for output on a multimedia display. The multimedia display may therefore include, for example, only speakers, or may include additional elements including video screens. The method of the present invention controls the updates to the numerous amusement devices 202–234 in an efficient manner. In particular, the method of the present invention does not require the central station 236 to transmit to every amusement device 202–234 in order to update each amusement device 202–234.

According to the method of the present invention, a first set of amusement devices is selected. Referring to FIG. 2, a first set 238 of the amusement devices 202–234 consisting of amusement devices 202–206 is shown selected as the first set 238. The amusement devices in the first set 238 are all capable of directly connecting to the central station 236 through one of the communications links described above. In principle, any number of amusement devices 202–206 may by connected directly to the central station 236. Furthermore, the selection of the first subset need not include every amusement device connected directly to the central station 236. The amusement devices 208–234 which are not included in the first subset 238 may be considered to form a second set 240 of amusement devices.

Once the first set 238 has been chosen, each amusement device in the first set 238 connects to the central station 236. Once connected, the amusement devices, for example amusement device 202 transfers (downloads) data from the central station 236. The downloaded data may, for example represent a new song, advertisement, or other information. Storage in the amusement device may be implemented, for example, as a writeable-CD, re-writeable CD, disk drive, tape drive, EEPROM, or flash memory. In general, the storage may hold any type of electronic information, including digitized songs, static images, image sequences (video), and sounds suitable for advertisements, attractive displays, or other information (such as weather updates). The amusement device may also transfer program updates (for example, bug fixes) designed to update the software in an electronic amusement device.

Figure 3:
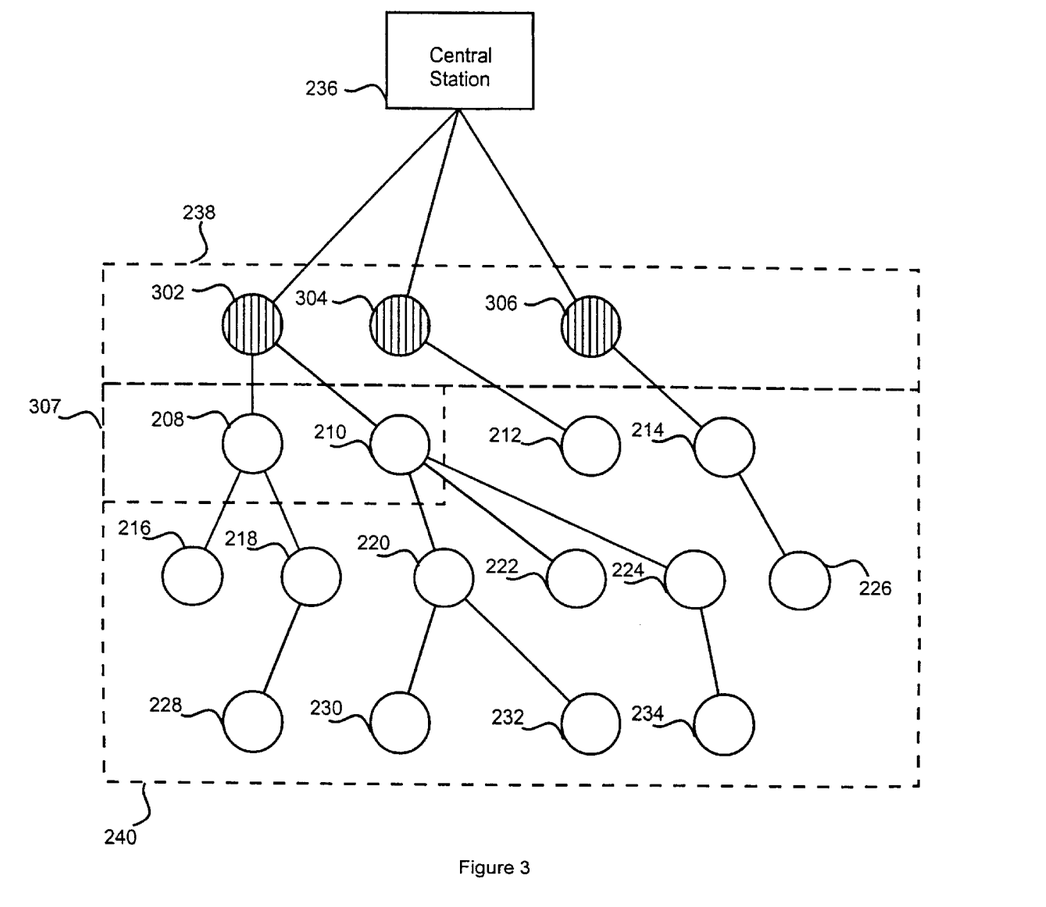
FIG. 3 shows a first set of updated electronic amusement devices connected to a second set of non-updated electronic amusement devices and a central station.

After transferring the data, the amusement device is considered an updated amusement device. Referring to FIG. 3, that figure indicates with a hatching pattern that the amusement devices 302–306 are updated versions of the amusement devices 202–206 of FIG. 2. The subsequent steps in the method of the present invention allow any updated electronic amusement device to, in turn, update any non-updated amusement devices. First, an updated electronic amusement device is selected, for example amusement device 302 in FIG. 3. Subsequently, a first subset of amusement devices is selected from the second set 240 of non-updated amusement devices. As one example, the first selected subset (307) may consist of amusement devices 208 and 210. The amusement devices in the subset may be chosen according to any criteria. For example, the subset may consist of amusement devices in the same telephone area code as the amusement device 302, or may consist of amusement devices physically nearby one another on a local network.

Figure 4:
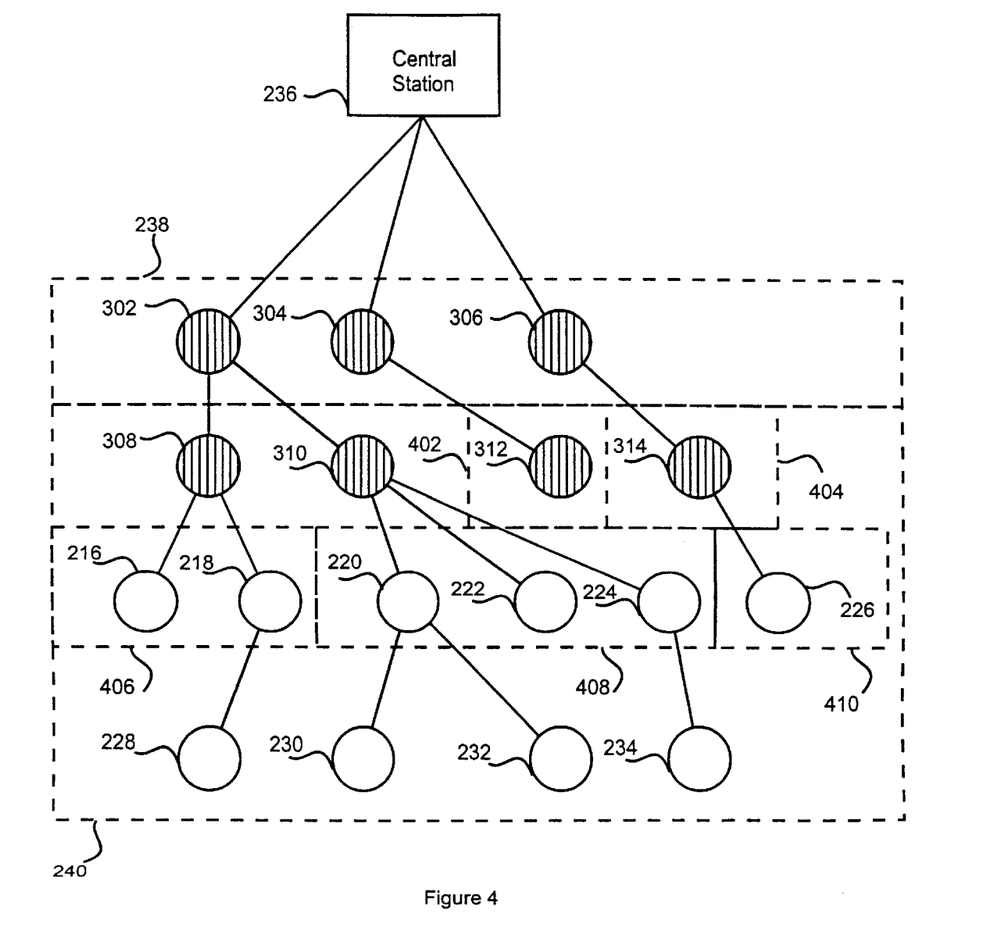
FIG. 4 shows the results of an iteration of the updating method according to the present invention starting from the configuration of FIG. 3.

Once the first subset 307 is chosen, the selected updated amusement device 302 connects to each non-updated amusement device 208 and 210 in the first subset 307 and downloads song updates or other information to the non-updated amusement devices 208 and 210. The selected amusement device 302 may use a MODEM, for example, to sequentially call each non-updated amusement device 208 and 210 in the first subset 307 and download data. Each non-updated amusement device 208 and 210 in the first subset 307 thereby becomes an updated amusement device and may be selected as an updated amusement device in a subsequent selecting and updating step. In FIG. 4, the amusement devices 208 and 210 are shown updated (and indicated by reference numeral 308 and 310) by the selected amusement device 202. In other words, and as previously stated, amusement devices 208 and 210 formed a first subset 307 of the second set 240 during an update step in which amusement device 302 operated as the selected update amusement device.

Typically, an updated amusement device is not considered in a subsequent subset selection step since the amusement device is already updated. In addition, the selection of an updated amusement device need not be a physical selection in response to, for example, operator input. Rather, the selection process may comprise a program running in the amusement devices 202–234 which periodically initiates a connection to another amusement device 202–234 or the central station 236. As will be explained in more detail below, the selection process may also be responsive to a download tree generated by an updated amusement device and forwarded to each amusement device as the amusement device is updated. Furthermore, internal timers, implemented as, for example, real time clocks, may control the periodic update of the amusement devices 202–234.

FIG. 4 also shows the result of the updated amusement device 304 having updated amusement device 212 (the only member chosen to form the second subset 402) and the result of the updated amusement device 306 having updated amusement device 214 (the only member chosen to form the third subset 404). The reference numerals 312 and 314 in FIG. 4 indicated updated versions of the amusement devices 212 and 214. The steps of selecting an updated amusement device, selecting a subset of the second set, connecting the selected updated amusement device to each electronic amusement device in the selected subset, and downloading information are iterated until a predetermined number of the amusement devices 202–234 are updated.

Figure 5:
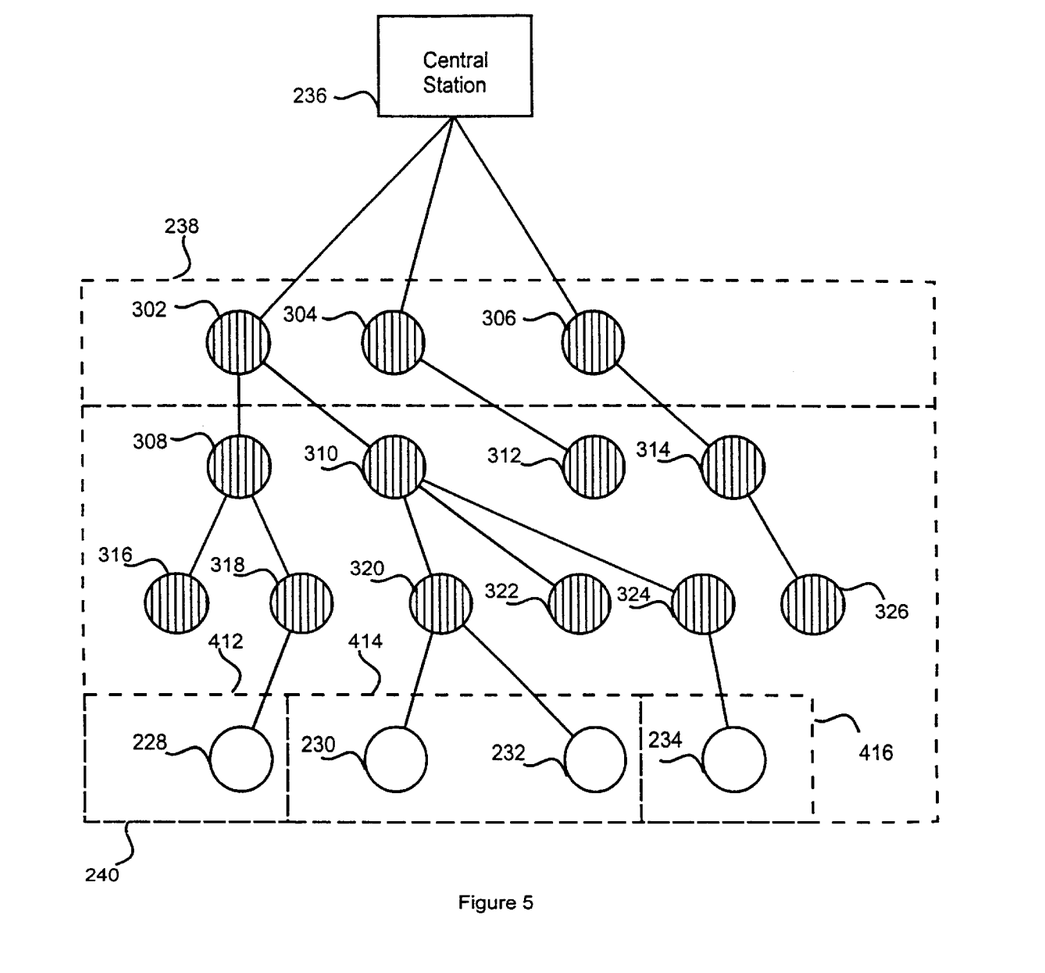
FIG. 5 shows the results of an iteration of the updating method according to the present invention starting from the configuration of FIG. 4.

For example, in FIG. 4, the amusement devices 308–314, now updated, may proceed to update additional amusement devices. As an example, the updated amusement device 308 may then select a fourth subset 406 of non-update amusement devices consisting of amusement devices 216 and 218, the updated amusement device 310 may select a fifth subset 408 consisting of amusement devices 220, 222, and 224, while the updated amusement device 314 may select a sixth subset 410 consisting of amusement device 226. Each updated amusement device 308–314 downloads information to the non-updated amusement devices 216–226. FIG. 5 shows each amusement device 216–226 after updating, indicated by reference numerals 316–326.

Figure 6:
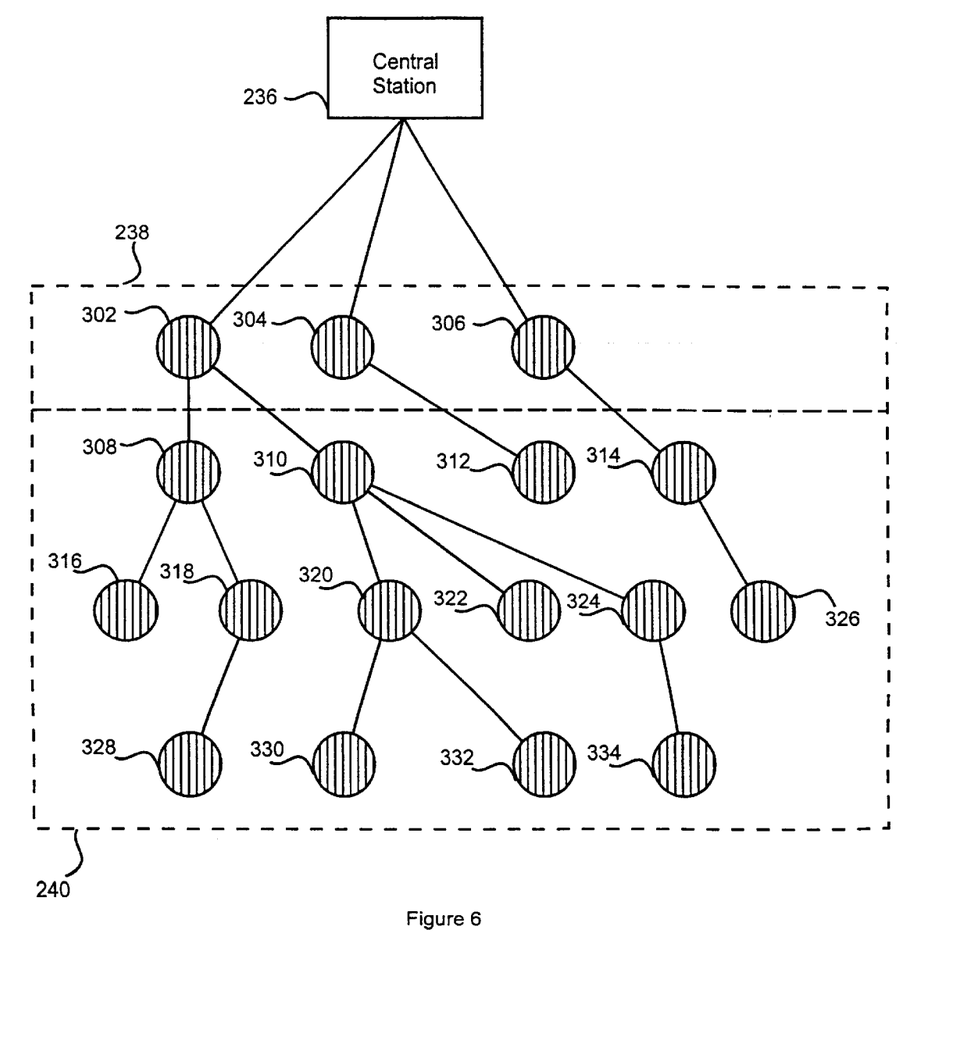
FIG. 6 shows the results of an iteration of the updating method according to the present invention starting from the configuration of FIG. 5.

Performing another iteration competes the updating procedure for all of the originally non-updated amusement devices 208–234 in the second set 240. Updated amusement device 318, for example, may select a seventh subset 412 consisting of amusement device 228, updated amusement device 320 may select an eighth subset 414 consisting of amusement devices 230 and 232, while the update amusement device 324 may select a ninth subset 416 consisting of amusement devices 234. FIG. 6 shows each amusement device 228–234 after updating, indicated by reference numerals 328–334.

Performing downloading according to the above described method greatly reduces the bandwidth requirements of the central station 236 by distributing the updating functions to the amusement devices. It is noted that the connections shown in FIGS. 2–6 need not be static. In other words, it may be possible for a particular amusement device to use a MODEM, for example, to update any or none of the other amusement devices and to select a new subset of amusement devices each time the method is invoked. When it is desirable to reduce the costs associated with updating the amusement devices, a particular amusement device may, for example, be programmed or configured to only update amusement devices in its own telephone area code or telephone exchange. Furthermore, the mechanism used to download information may change each time information is downloaded. For example, updated amusement device 308 may use a MODEM to connect to amusement devices 216 and 218, while updated amusement device 318 may use an RF link to update amusement device 228.

In addition, an amusement device 202–234 may create an information download tree (implemented as any common data structure, for example, a linked list) which maps the manner in which a subsequent amusement device 202–234 should update other amusement devices 202–234. For example, amusement device 202 may create a download tree specifying that amusement device 208 will update amusement devices 216 and 218, and that amusement device 218 will update amusement device 228. The download tree may then be forwarded to amusement devices 202–234 during the downloading of any other information.

Thus, one or more amusement devices 202–234 may relieve the burden of determining which amusement devices 202–234 to update to from other amusement devices 202–234. An amusement device 202–234 at any level may create a download tree and forward the download tree to subsequent amusement devices 202–234. Furthermore, the download tree may include alternative update schemes to be employed if a particular link between amusement devices 202–234 is inoperable. For example, amusement device 208 may include further information in the download tree instructing amusement device 216 update amusement device 228 if the link between amusement device 218 and amusement device 228 is inoperable.

While particular elements, embodiments and applications of the present invention have been shown and described, it will be understood, of course, that the invention is not limited thereto since modifications may be made by those skilled in the art, particularly in light of the foregoing instruction. It is therefore contemplated by the appended claims to cover such modifications as incorporate those features which come within the spirit and scope of the invention.

What is claimed is:

1. An improved method of updating electronic data stored in a plurality of electronic amusement devices, each electronic amusement device including memory for storing digital data, a communications interface, and a processor connected to said communications interface and said memory, said method comprising the steps of:

a) providing a central station for storing data;

b) determining a first set of at least one non-updated electronic amusement device;

c) connecting each non-updated electronic amusement device in said first set to said central station and downloading information to said non-updated electronic amusement device, thereby providing at least one updated electronic amusement device;

d) determining a second set of at least one non-updated electronic amusement device;

e) iterating the following steps:
   1) selecting an updated electronic amusement device provided by downloading said information to a non-updated electronic amusement device;
   2) determining a subset of said second set of at least one non-updated electronic amusement devices, said subset thereby including at least one non-updated electronic amusement device;
   3) connecting said selected updated electronic amusement device to each non-updated electronic amusement device in said subset and downloading said information to said non-updated electronic amusement device, thereby providing at least one additional updated electronic amusement device which may be selected in a subsequent selection step.

2. The method of claim 1, wherein said iterating step iterates at least twice to download information to a first subset of non-updated electronic amusement devices and to download information to a second subset of non-updated electronic amusement devices.

3. The method claim 1, wherein said iterating step iterates at least three times to download information to a first subset of non-updated electronic amusement devices, to download information to a second subset of non-updated electronic amusement devices, and to download information to a third subset of non-updated electronic amusement devices.

4. The method claim 1, wherein said iterating step iterates until each non-updated amusement device in said second set has information downloaded to it.

5. The method of claim 1, wherein said connecting and downloading step e3 comprises the step of establishing a connection over a telephone line for at least one iterating step.

6. The method of claim 1, wherein said connecting and downloading step c comprises the step of establishing a connection over a telephone line.

7. The method of claim 6, wherein said connecting and downloading step e3 comprises the step of establishing a connection over a telephone line for at least one iterating step.

8. The method of claim 4, wherein said connecting and downloading step e3 comprises the step of establishing a connection over a telephone line for at least one iterating step.

9. The method of claim 4, wherein said connecting and downloading step c comprises the step of establishing a connection over a telephone line.

10. The method of claim 9, wherein said connecting and downloading step e3 comprises the step of establishing a connection over a telephone line for at least one iterating step.

11. The method of claim 1, wherein said connecting and downloading step c comprises downloading information selected from the group consisting essentially of advertisements, music, and computer program updates.

12. The method of claim 11, wherein said connecting and downloading step e3 comprises downloading information selected from the group consisting essentially of advertisements, music, and computer program updates.

13. The method of claim 4, wherein said connecting and downloading step c comprises downloading information selected from the group consisting essentially of advertisements, music, and computer program updates.

14. The method of claim 13, wherein said connecting and downloading step e3 comprises downloading information selected from the group consisting essentially of advertisements, music, and computer program updates.

15. The method of claim 1, wherein said connecting and downloading step c is responsive to a control selected from the group consisting essentially of computer programs, external inputs, and timers.

16. The method of claim 15, wherein said connecting and downloading step e3 is responsive a control selected from the group consisting essentially of computer programs, external inputs, and timers.

17. The method of claim 4, wherein said connecting and downloading step c is responsive to a control selected from the group consisting essentially of computer programs, external inputs, and timers.

18. The method of claim 17, wherein said connecting and downloading step e3 is responsive a control selected from the group consisting essentially of computer programs, external inputs, and timers.

19. The method of claim 1, wherein said connecting and downloading step e3 further comprises the step of transmitting a download tree.

20. The method of claim 19, wherein said connecting and downloading of step e3 further comprises the step of transmitting at least one alternate update scheme.

21. An improved method of updating electronic data stored in a computer jukebox, each computer jukebox providing a memory for storing digital data representing a plurality of songs, a digital to analog converter, at least one speaker connected to said digital to analog converter, a communications interface, and a processor connected to said communications interface and said memory, said method comprising the steps of:

a) determining a first set of at least one non-updated computer jukebox;

b) connecting each non-updated computer jukebox in said first set to a central station and downloading information to said non-updated computer jukebox, thereby providing at least one updated computer jukebox;

c) determining a second set of at least one non-updated computer jukebox;

d) iterating the following steps:
   1) selecting an updated computer jukebox provided by downloading said information to a non-updated computer jukebox;
   2) determining a subset of said second set of at least one non-updated computer jukebox, said subset thereby including at least one non-updated computer jukebox;
   3) connecting said selected updated computer jukebox to each non-updated computer jukebox in said subset and downloading said information to said non-updated computer jukebox, thereby providing at least one additional updated computer jukebox which may be selected in a subsequent selection step.

22. The method of claim 21, wherein said iterating step iterates at least twice to download information to a first subset of non-updated computer jukeboxes and to download information to a second subset of non-updated computer jukeboxes.

23. The method claim 21, wherein said iterating step iterates at least three times to download information to a first subset of non-updated computer jukeboxes, to download information to a second subset of non-updated computer jukeboxes, and to download information to a third subset of non-updated computer jukeboxes.

24. The method claim 21, wherein said iterating step iterates until each non-updated device in said second set has information downloaded to it.

25. The method of claim 21, wherein said connecting and downloading step b downloads information selected from the group consisting essentially of advertisements, music, and computer program updates.

26. An improved method of updating electronic data stored in an electronic dart game, each electronic dart game providing a memory for storing digital data, a dart target, a communications interface, and a processor connected to said communications interface and said memory, said method comprising the steps of:
  a) determining a first set of at least one non-updated electronic dart game;
  b) connecting each non-updated electronic dart game in said first set to a central station and downloading information to said non-updated electronic dart game, thereby providing at least one updated electronic dart game;
  c) determining a second set of at least one non-updated electronic dart game;
  d) iterating the following steps:
    1) selecting an updated electronic dart game provided by downloading said information to a non-updated electronic dart game;
    2) determining a subset of said second set of at least one non-updated electronic dart game, said subset thereby including at least one non-updated electronic dart game;
    3) connecting said selected updated electronic dart game to each non-updated electronic dart game in said subset and downloading said information to said non-updated electronic dart game, thereby providing at least one additional updated electronic dart game which may be selected in a subsequent selection step.

27. The method of claim 26, wherein said iterating step iterates at least twice to download information to a first subset of non-updated electronic dart games and to download information to a second subset of non-updated electronic dart games.

28. The method claim 26, wherein said iterating step iterates at least three times to download information to a first subset of non-updated electronic dart games, to download information to a second subset of non-updated electronic dart games, and to download information to a third subset of non-updated electronic dart games.

29. The method claim 26, wherein said iterating step iterates until each non-updated device in said second set has information downloaded to it.

30. The method of claim 26, wherein said connecting and downloading step b downloads information selected from the group consisting essentially of advertisements, music, and computer program updates.

* * * * *